United States Patent
Ishihara

(10) Patent No.: US 10,379,458 B2
(45) Date of Patent: Aug. 13, 2019

(54) IMAGE FORMING APPARATUS AND PHOTOSENSITIVE MEMBER UNIT

(71) Applicant: CANON KABUSHIKI KAISHA, Tokyo (JP)

(72) Inventor: Shotaro Ishihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/956,114

(22) Filed: Apr. 18, 2018

(65) Prior Publication Data

US 2018/0321611 A1  Nov. 8, 2018

(30) Foreign Application Priority Data

May 2, 2017 (JP) .................................. 2017-091715

(51) Int. Cl.
| | |
|---|---|
| *G03G 15/04* | (2006.01) |
| *G03G 15/16* | (2006.01) |
| *G03G 15/00* | (2006.01) |
| *G03G 15/08* | (2006.01) |

(Continued)

(52) U.S. Cl.
CPC ....... *G03G 15/04045* (2013.01); *G02B 6/002* (2013.01); *G02B 6/0028* (2013.01); *G02B 6/0031* (2013.01); *G02B 6/0051* (2013.01); *G02B 6/0055* (2013.01); *G03G 15/0865* (2013.01); *G03G 15/1615* (2013.01); *G03G 15/5054* (2013.01); *G03G 21/08* (2013.01); *G03G 15/161* (2013.01)

(58) Field of Classification Search
CPC ............. G03G 15/04045; G03G 21/06; G03G 21/0094; G03G 21/08; G02B 6/0051; G02B 6/0055
See application file for complete search history.

(56) References Cited

U.S. PATENT DOCUMENTS

| | | |
|---|---|---|
| 9,836,009 B2 | 12/2017 | Ishihara et al. |
| 9,927,730 B2 | 3/2018 | Tokudome et al. |

(Continued)

FOREIGN PATENT DOCUMENTS

| | | |
|---|---|---|
| JP | 2003-295717 A | 10/2003 |
| JP | 2014-096288 A | 5/2014 |

(Continued)

*Primary Examiner* — Sandra Brase
(74) *Attorney, Agent, or Firm* — Venable LLP

(57) ABSTRACT

An image forming apparatus includes a rotatable photosensitive member, an image forming portion, and a light irradiating portion configured to irradiate the photosensitive member with light after transferring the toner image onto the transfer material. The light irradiating portion includes a first light guide body configured to extend along a rotation axial direction of the photosensitive member, a light source portion provided to face an end surface portion of the first light guide body in the rotation axial direction, a reflecting portion disposed to face the first light guide body in an intersecting direction intersecting with the rotation axial direction, and a second light guide body comprising a facing portion disposed to face the first light guide body and to oppose the reflecting portion through the first light guide body, and configured to irradiate the photosensitive member with the light transmitted through the first light guide body.

18 Claims, 8 Drawing Sheets

(51) Int. Cl.
  *G03G 21/08*    (2006.01)
  *F21V 8/00*     (2006.01)

(56) References Cited

U.S. PATENT DOCUMENTS

| | | | |
|---|---|---|---|
| 2006/0060751 A1* | 3/2006 | Nishimura | G03G 21/08 250/208.1 |
| 2009/0324286 A1* | 12/2009 | Okabe | G03G 21/08 399/128 |
| 2014/0133183 A1 | 5/2014 | Hagiwara et al. | |
| 2016/0147169 A1* | 5/2016 | Saito | G03G 21/08 399/128 |

FOREIGN PATENT DOCUMENTS

| | | | |
|---|---|---|---|
| JP | 2016-057593 A | | 4/2016 |
| JP | 2016057593 | * | 4/2016 |
| JP | 2017-058433 A | | 3/2017 |

* cited by examiner

IMAGE FORMING APPARATUS AND PHOTOSENSITIVE MEMBER UNIT

BACKGROUND OF THE INVENTION

Field of the Invention

The present invention relates to an image forming apparatus and a photosensitive member unit configured to form an image on a recording member by an electro-photographic system or an electrostatic recording system.

Description of the Related Art

Hitherto, an electro-photographic image forming apparatus has been widely used as a copier, a printer, a plotter, a facsimile machine, and a multi-function printer having their multiple functions. Among the image forming apparatuses of this sort, one which is widespread is what uses two-component developer mainly containing non-magnetic toner and magnetic carrier and develops an electrostatic image formed on a photosensitive drum serving as a photosensitive member. Such image forming apparatus is configured to homogeneously charge a surface of the photosensitive drum by a charging unit and to expose the surface of the photosensitive drum to form an electrostatic latent image. Then, after developing the electrostatic latent image by toner supplied from a developing sleeve, the developed toner image is transferred onto an intermediate transfer belt. The toner left on the photosensitive drum after the transfer is removed by a cleaning unit and is stored as removed toner within a cleaning container such as a waste toner box by a recovery toner conveyance unit. This arrangement makes it possible to form and develop a next electrostatic latent image in a condition in which no toner is left on the surface of the photosensitive drum.

In the image forming process as described above, there is a case where the charge potential on the photosensitive drum becomes inhomogeneous especially in a low-temperature and low-humidity environment and an image concentration difference that is so-called as a drum ghost is generated in developing the electrostatic latent image, thus degrading image quality. In order to prevent such drum ghost from being generated, there is known a technology of providing an irradiation unit configured to irradiate the photosensitive drum with light before the charging step to remove residual potential (see Japanese Patent Application Laid-open No. 2003-295717). This irradiation unit is configured to reflect light introduced from an end face of an approximately columnar light guide body by a plurality of reflecting portions arrayed in an axial direction of the light guide body to guide the reflected light to the photosensitive drum.

However, the irradiation unit of the image forming apparatus disclosed in Japanese Patent Application Laid-open No. 2003-295717 guides the light introduced from the end face and reflected by the plurality of reflecting portions defined in the light guide body to the photosensitive drum as it is. Therefore, a distance between the reflecting portion and the photosensitive drum is short in the irradiation unit, and a distribution of a light amount in a longitudinal direction on the photosensitive drum tends to be inhomogeneous due to a slight dimensional error, an assembling error or the like of the reflecting portion, possibly causing an imaging failure called the drum ghost. Because the distribution of the light amount in the longitudinal direction on the photosensitive drum is largely associated with dimensional accuracy and assembling accuracy of the reflecting portion of the light guide body, the distribution is liable to be influenced by the dimensional error and assembling error in particular in a case where the light guide body is downsized due to a demand for downsizing the image forming apparatus body and the drum cartridge. Still further, imaging troubles occur and mold correction of the light guide body is required many times if dimension of the light guide body is not fully accurate in a mass-production process, thus spending much time and cost.

SUMMARY OF THE INVENTION

The present disclosure provides an image forming apparatus including an exposing unit suitable for space-saving.

According to one aspect of the present invention, an image forming apparatus includes a rotatable photosensitive member, an image forming portion configured to form a toner image to be transferred onto a transfer material onto the photosensitive member, and a light irradiating portion configured to irradiate the photosensitive member with light after transferring the toner image onto the transfer material to remove electricity of the photosensitive member. The light irradiating portion includes a first light guide body configured to extend along a rotation axial direction of the photosensitive member, a light source portion provided to face an end surface portion of the first light guide body in the rotation axial direction, a reflecting portion disposed to face the first light guide body in an intersecting direction intersecting with the rotation axial direction and configured to reflect light from the first light guide body to the first light guide body, and a second light guide body comprising a facing portion disposed to face the first light guide body and to oppose the reflecting portion through the first light guide body, and configured to irradiate the photosensitive member with the light transmitted through the first light guide body.

According to another aspect of the present invention, a photosensitive member unit includes a rotatable photosensitive member that bears a toner image to be transferred onto a transfer material, and a light irradiating portion configured to irradiate the photosensitive member with light after transferring the toner image onto the transfer material to remove electricity of the photosensitive member. The light irradiating portion includes a first light guide body configured to extend along a rotation axial direction of the photosensitive member, light from a light source portion being irradiated to an end surface portion of the first light guide body in the rotation axial direction, a reflecting portion disposed to face the first light guide body in an intersecting direction intersecting with the rotation axial direction and configured to reflect light from the first light guide body to the first light guide body, and a second light guide body comprising a facing portion disposed to face the first light guide body and to oppose the reflecting portion through the first light guide body, and configured to irradiate the photosensitive member with the light transmitted through the first light guide body.

Further features of the present invention will become apparent from the following description of exemplary embodiments with reference to the attached drawings.

DESCRIPTION OF THE EMBODIMENTS

First Embodiment

An image forming apparatus 1 of a first embodiment of the present disclosure will be described in detail with reference to FIGS. 1 through 6. A tandem-type full-color printer will be described as an example of the image forming apparatus 1 in the present embodiment. However, the present disclosure is not limited to the tandem-type image forming apparatus 1 and may be an image forming apparatus of another type. Still further, the present disclosure is not limited to be a full-color printer, and may be a monochrome or mono-color printer. Or, the present disclosure can be carried out in various uses such as a printer, various printing machines, a copier, a facsimile machine, a multi-function printer and the like.

Figure 1:
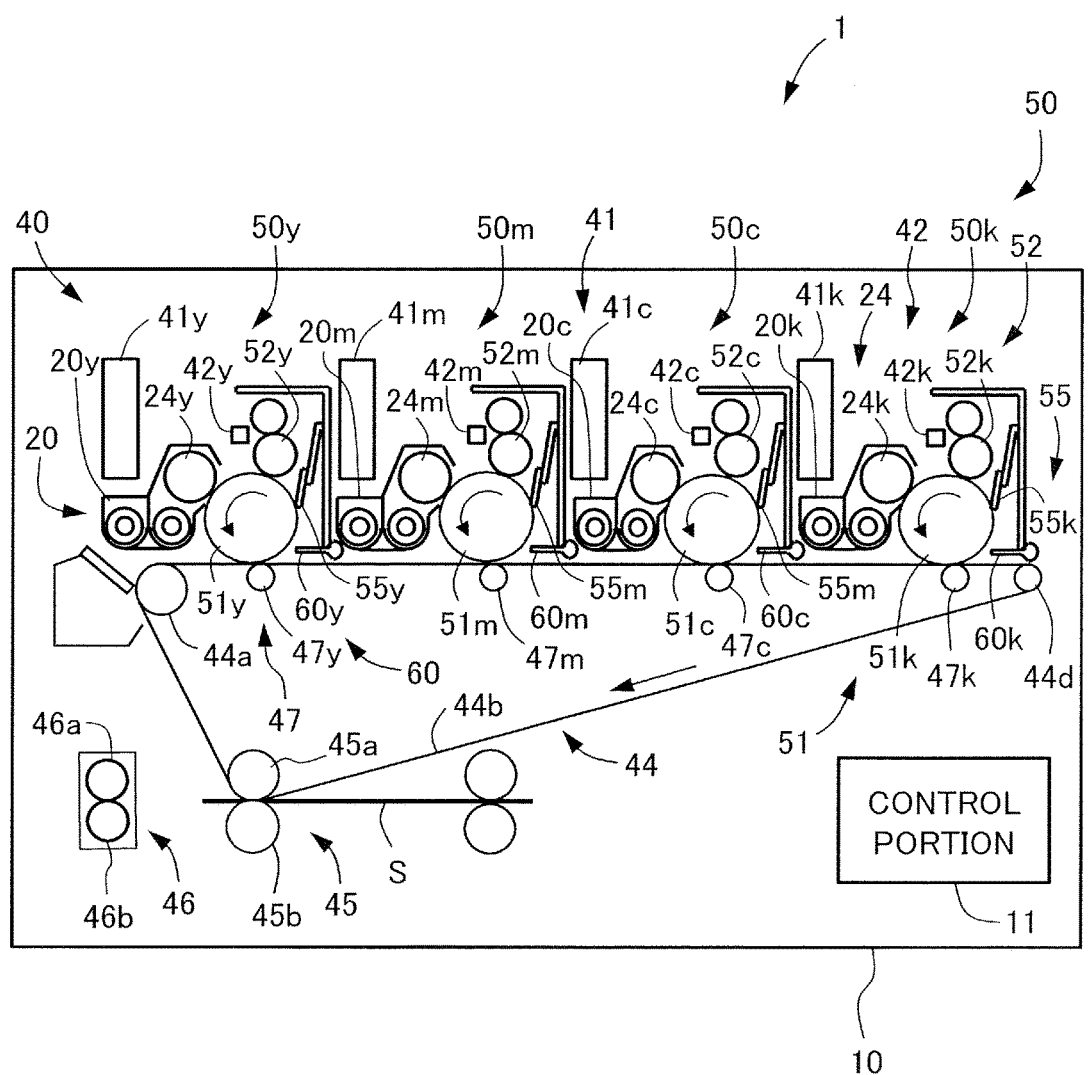
FIG. 1 is a section view schematically illustrating a configuration of an image forming apparatus of a first embodiment.

As illustrated in FIG. 1, the image forming apparatus 1 includes an apparatus body 10, a sheet feeding portion (not illustrated), an image forming portion 40, a sheet discharge portion (not illustrated), and a control portion 11. The image forming apparatus 1 is configured to be able to form a four color full-color image on a recording member corresponding to an image signal sent from a host apparatus such as a document reading apparatus not illustrated and a personal computer or from an external device such as a digital camera or a smartphone. A sheet S serving as the recording member is what a toner image is to be formed on and is, specifically, a plain sheet of paper, a synthetic resin sheet as a substitute of the plain sheet of paper, a thick sheet, or an overhead projector sheet.

The image forming portion 40 is configured to be able to form the image on the sheet S fed from the sheet feeding portion based on the image information. The image forming portion 40 includes a drum cartridge 50, a developing unit 20, toner bottles 41y, 41m, 41c, and 41k, exposing units 42y, 42m, 42c, and 42k, an intermediate transfer unit 44, a secondary transfer portion 45 and a fixing portion 46. It is noted that the image forming apparatus 1 of the present embodiment is adapted with formation of a full-color image and is provided with drum cartridges 50y, 50m, 50c, and 50k of four colors of yellow (y), magenta (m), cyan (c), and black (k), respectively, while each having a same structure. Therefore, while the respective configurations of the drum cartridges of the four colors within FIG. 1 are denoted by affixing identifiers of the colors after their reference numerals, there will be descriptions where the configuration is described only by the reference numerals without affixing the identifiers of the colors, such as in FIGS. 2-5, 7 and 8. Still further, a lateral left-side direction from a front of the image forming apparatus 1 will be represented as a first direction D1, a lateral right-side direction will be represented as a second direction D2, and a width direction of the sheet S being conveyed, i.e., a front-back direction or a depth direction of the image forming apparatus 1, will be represented as a width direction W in the present embodiment.

Figure 2:
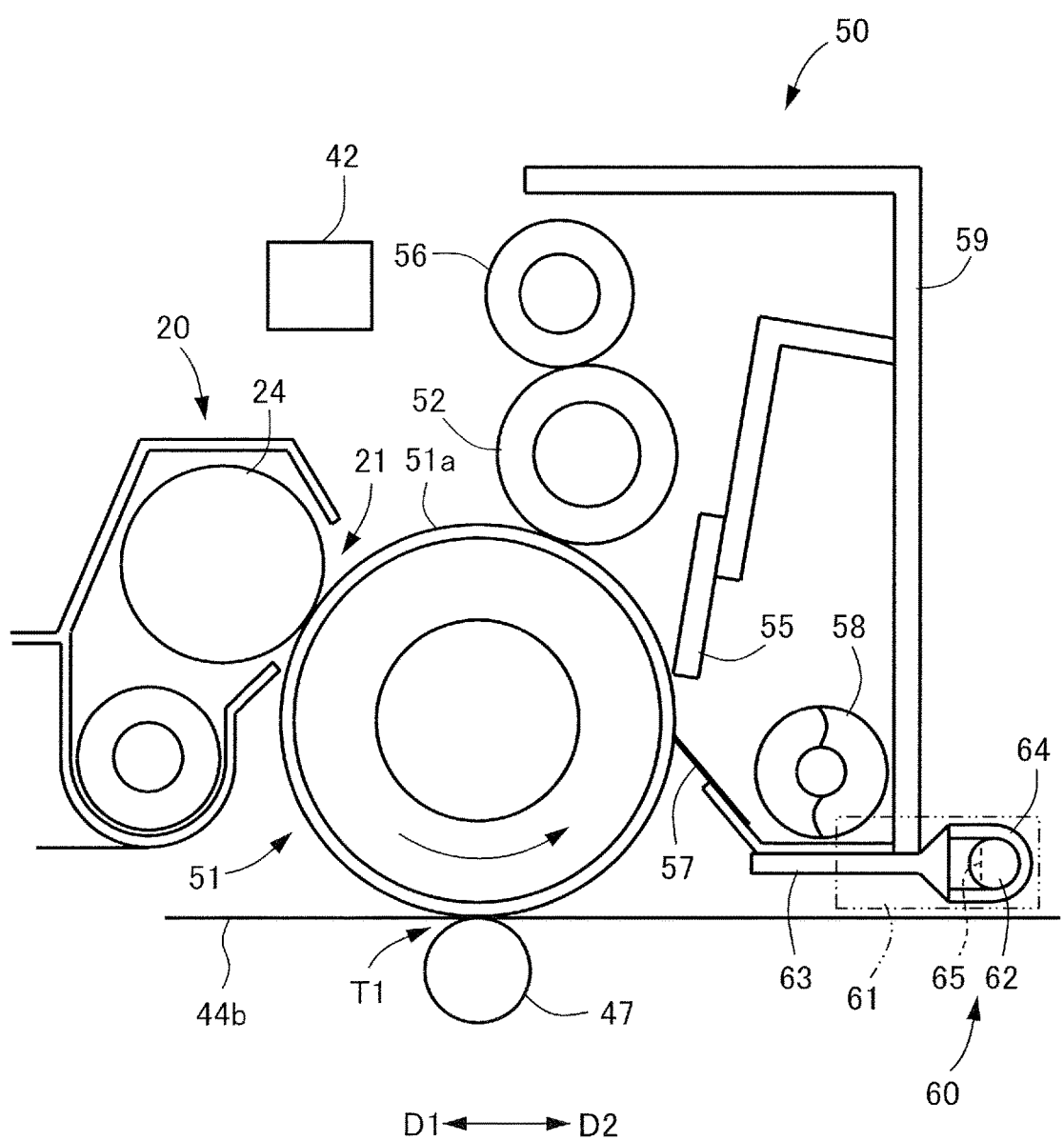
FIG. 2 is a section view illustrating a drum cartridge of the image forming apparatus of the first embodiment.
Figure 3:
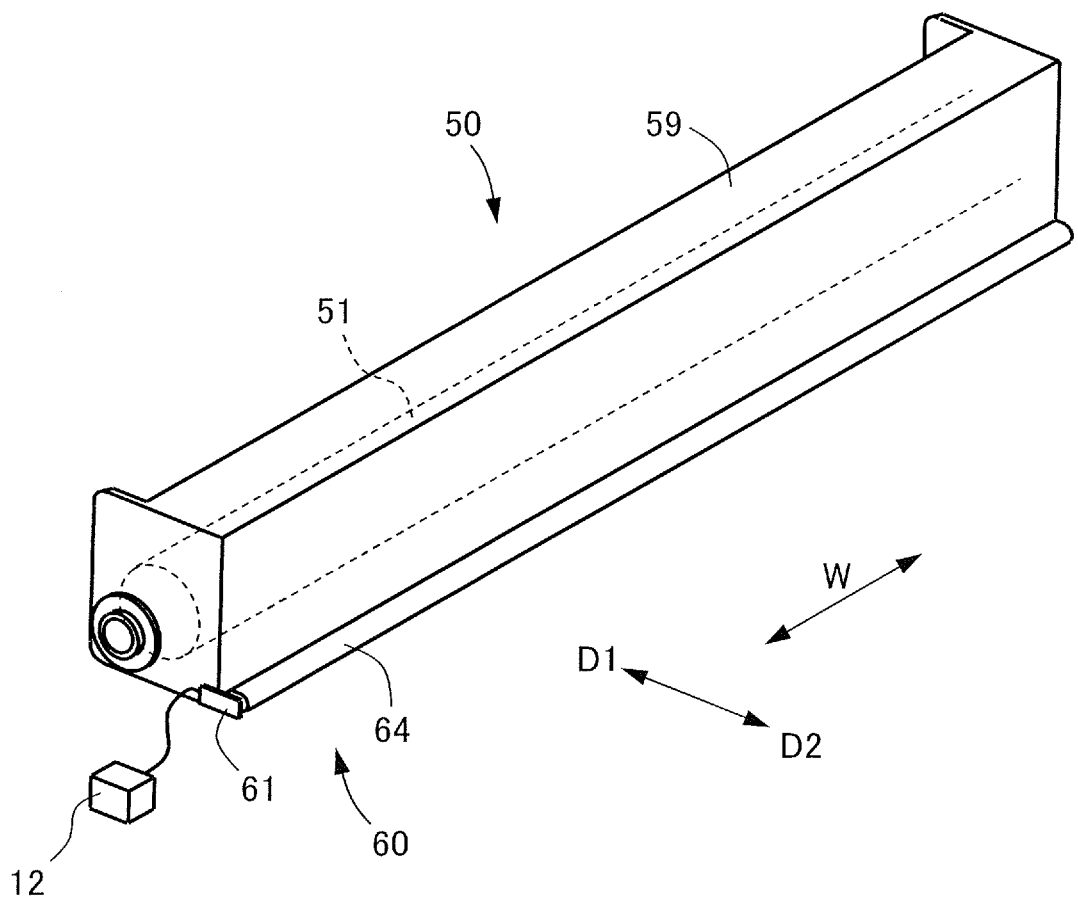
FIG. 3 is a perspective view illustrating the drum cartridge of the image forming apparatus of the first embodiment.

The drum cartridge 50 is a unitized photosensitive member unit and is removably attached to the apparatus body 10. The drum cartridge 50 includes a photosensitive drum or a photosensitive member 51 rotatable while bearing a toner image, a charging roller serving as a charging unit 52, a pre-exposing unit serving as an irradiating unit 60, and a cleaning blade 55. The charging roller 52, the pre-exposing unit 60 and the cleaning blade 55 are provided around the photosensitive drum 51. Still further, as illustrated in FIG. 2, the drum cartridge 50 includes a cleaning roller 56 being in contact with the charging roller 52, a collection sheet 57, a toner conveyance portion 58 and a casing 59. The photosensitive drum 51, the charging roller 52, the cleaning roller 56, the cleaning blade 55, the collection sheet 57, the toner conveyance portion 58 and the pre-exposing unit 60 are provided within the casing 59 to unitize as the drum cartridge 50 (see FIG. 3) in the present embodiment. This arrangement makes it possible to removably attach the casing 59 to the apparatus body 10 per each casing 59. The drum cartridge 50 is separated from the developing unit 20 having a different durable life.

The photosensitive drum 51 is rotatable and bears an electrostatic latent image used in forming an image. The photosensitive drum 51 is formed into a cylindrical shape having a 30 mm diameter, for example. The photosensitive drum 51 is a negative polarity organic photosensitive member (OPC) and is rotationally driven by a motor (not illustrated) in a direction of an arrow with 240 mm/sec of process speed, for example. The photosensitive drum 51 includes the aluminum cylinder as a substrate and three layers of an under-coating layer, a photoelectric charge generating layer and a charge transport layer sequentially coated and laminated.

The charging roller 52 is a rubber roller 14 mm in an outer diameter and 320 mm in length, for example, and rotates by being in contact with the surface of and being driven by the photosensitive drum 51. The charging roller 52 is connected with a charge bias power supply. The charging roller 52 is configured to press the photosensitive drum 51 with a load of 1 kg in total at both ends of a core metal. The charging roller 52 is capable of applying −300 V to −1000 V of DC voltage and 2700 V of AC voltage to the photosensitive drum 51 by the charge bias power source and is capable of homogeneously charging the surface of the photosensitive drum 51.

The exposing unit 42 is a laser scanner and emits a laser beam in accordance with image information of separated colors outputted from the control portion 11. The exposing unit 42 is configured to be able to longitudinally form an image 305 mm in length, for example. The surface of the photosensitive drum 51 homogeneously charged by the charging roller 52 is exposed by the laser beam of the exposing unit 42 and an electrostatic latent image is formed thereon.

The developing unit 20 includes a developing sleeve 24 and develops the electrostatic latent image formed on the surface of the photosensitive drum 51 by toner by applying developing bias. The developing unit 20 stores developer supplied from the toner bottle 41 (see FIG. 1) and develops the electrostatic latent image formed on the photosensitive drum 51. The developing sleeve 24 bears the developer composed of non-magnetic toner and magnetic carrier and conveys the developer to a developing area 21 facing the photosensitive drum 51. Then, the developing sleeve 24 is coated by the developer in a range of 310 mm in the longitudinal direction. The developing sleeve 24 is made of a non-magnetic material such as aluminum and non-magnetic stainless steel. The developing sleeve 24 is made of aluminum in the present embodiment.

A toner image developed and formed on the surface of the photosensitive drum 51 is primarily transferred onto an intermediate transfer belt 44b serving as a transfer material of an intermediate transfer unit 44 (see FIG. 1) at a primary transfer portion, i.e., a transfer portion, T1. That is, the charged surface of the photosensitive drum 51 is exposed, the electrostatic latent image formed by the exposure is developed by the toner, and the toner image thus developed and formed is transferred onto the intermediate transfer belt 44b at the primary transfer portion T1. A pre-exposing unit 60 irradiates the surface of the photosensitive drum 51 that has rotated and passed through the primary transfer portion T1 with light to remove electricity of the surface. The pre-exposing unit 60 is provided at a lower end portion of the second direction D2 side of the casing 59 of the drum cartridge 50 (see FIG. 3). A detailed configuration of the pre-exposing unit 60 will be described later.

The cleaning blade 55 is a plate-like member made of urethane rubber, for example, and is pressed to the photosensitive drum 51 with a predetermined linear pressure by a counter blade system. The cleaning blade 55 scrapes off the toner left on the surface of the photosensitive drum 51 after the toner image on the photosensitive drum 51 has been primarily transferred onto the intermediate transfer belt 44b and the electricity of the surface of the photosensitive drum 51 has been removed. A collecting sheet 57 is a sheet member whose edge is in contact with the photosensitive drum 51 and collects the toner scraped off by the cleaning blade 55. The toner collected by the collection sheet 57 is conveyed to a collection toner box or the like (not illustrated) provided in the apparatus body 10 by rotating a screw, i.e., a toner conveyance portion 58.

As illustrated in FIG. 1, the intermediate transfer unit 44 includes a plurality of rollers such as a driving roller 44a, a driven roller 44d, primary transfer rollers 47y, 47m, 47c, and 47k and the intermediate transfer belt 44b wrapped around these rollers and moving while bearing a toner image. The primary transfer rollers, i.e., the transfer units, 47y, 47m, 47c, and 47k are disposed so as to face the photosensitive drums 51y, 51m, 51c, and 51k, respectively, and are in contact with the intermediate transfer belt 44b to primarily transfer the toner image on the photosensitive drum 51 onto the intermediate transfer belt 44b.

The toner image formed on the photosensitive drum 51 is primarily transferred onto the intermediate transfer belt 44b at the primary transfer portion T1 by the primary transfer bias applied thereto. The secondary transfer portion 45 includes a secondary transfer inner roller 45a and a secondary transfer outer roller 45b, and the toner image on the intermediate transfer belt 44b is secondarily transferred onto the sheet S by a secondary transfer bias applied at a nip portion between the secondary transfer outer roller 45b and the intermediate transfer belt 44b. The fixing portion 46 includes a fixing roller 46a and a pressure roller 46b, and the toner image transferred onto the sheet S is fixed to the sheet S by heat and pressure applied to the sheet S while the sheet S is nipped and conveyed between the fixing roller 46a and the pressure roller 46b.

The control portion 11 is composed of a computer, and includes a CPU, a ROM configured to store programs for controlling the respective portions, a RAM temporarily storing data, and an input/output circuit configured to input/output signals from/to outside. The CPU is a microprocessor and a main part of a system controller managing whole control of the image forming apparatus 1. The CPU is connected with the sheet feeding portion, the image forming portion 40, and the sheet discharge portion through the input/output circuit and exchanges signals with the respective portions to control operations. The ROM stores an image forming control sequence for forming the image on the sheet S and the like.

An image forming operation of the image forming apparatus 1 constructed as described above will be described next.

As the image forming operation is started, the photosensitive drum 51 rotates such that the surface of the photosensitive drum 51 is charged by the charging roller 52. Then, the exposing unit 42 irradiates the photosensitive drum 51 with the laser beam based on the image information to form an electrostatic latent image on the surface of the photosensitive drum 51. The developing unit 20 applies the toner to the electrostatic latent image to develop the electrostatic latent image and to visualize as a toner image. The toner image is then primarily transferred onto the intermediate transfer belt 44b.

Meanwhile, in parallel with the toner image forming operation as described above, the sheet S is supplied and is conveyed to the secondary transfer portion 45 through a conveyance path in synchronism with the toner image on the intermediate transfer belt 44b. Still further, the image is transferred from the intermediate transfer belt 44b to the sheet S, and the sheet S is conveyed to the fixing portion 46 such that the non-fixed toner image is fixed on the surface of the sheet S under heat and pressure. The sheet S is then discharged out of the apparatus body 10.

Figure 4:
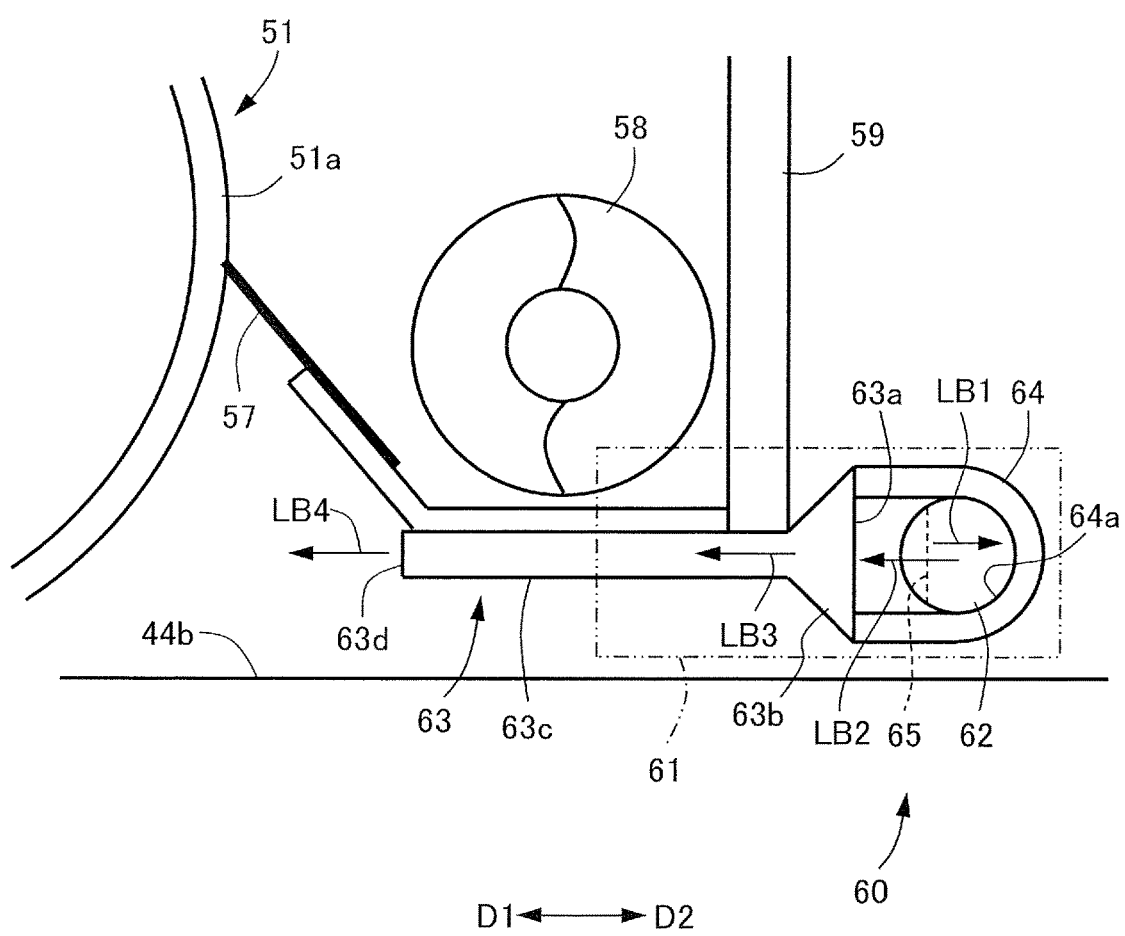
FIG. 4 is a section view illustrating a pre-exposing unit of the first embodiment.
Figure 5:
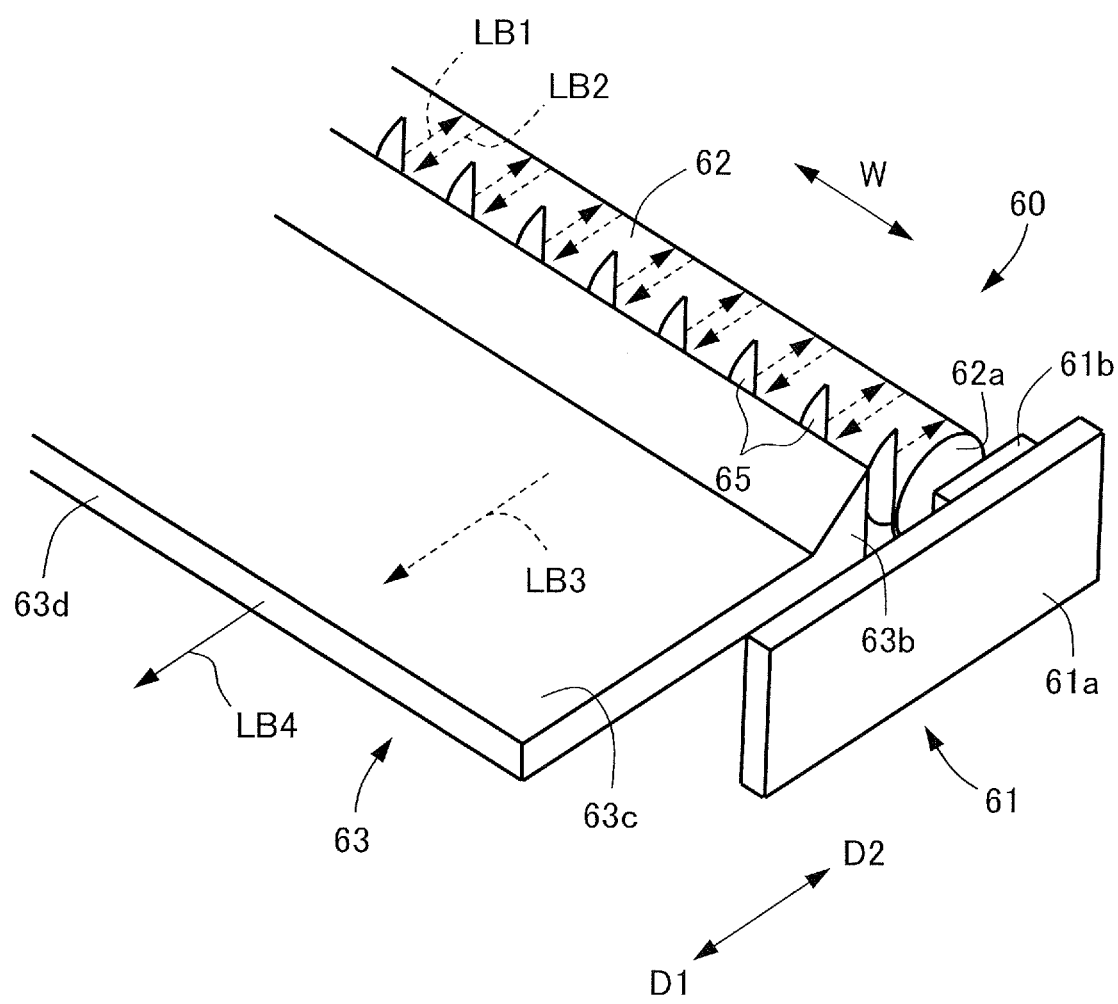
FIG. 5 is a perspective view illustrating a state in which a cover member of the pre-exposing unit of the first embodiment is removed.

Next, the pre-exposing unit 60 of the image forming apparatus 1 of the present embodiment will be described in detail with reference to FIGS. 4 and 5. The pre-exposing unit 60 includes a light source portion 61 capable of emitting light, a main light guide portion serving as a first light guide body 62, a sub-light guide portion serving as a second light guide body 63, and a cover member serving as a reflecting portion 64.

The light source portion 61 includes an electric board 61a and an LED 61b which is a light source mounted to the electric board 61a. The light source portion 61 is provided at the lower end portion of the second direction D2 side of the casing 59 only on a front side of the width direction W such that the LED 61b faces an end face 62a of the main light guide portion 62 from outside of the casing 59. The light source portion 61 is connected with a power supply 12 (see FIG. 3) provided in the apparatus body 10 as the drum cartridge 50 is attached to the apparatus body 10. The power supply 12 is controlled by the control portion 11.

The main light guide portion 62 is formed approximately into a cylindrical shape or columnar shape and is formed of an insulating material having high light transmission properties such as polycarbonate and acryl. The main light guide portion 62 is provided at the lower end portion of the second direction D2 side of the casing 59 such that a longitudinal direction thereof orients in the width direction W. The main light guide portion 62 is held by the cover member 64 and positioned relative to the sub-light guide portion 63 in the present embodiment. The LED 61b of the light source portion 61 is provided so as to face the end face 62a on the front direction side of the width direction W of the main light guide portion 62, and light emitted from the light source portion 61 is inputted into the end face 62a of the main light guide portion 62.

The main light guide portion 62 includes a plurality of reflecting portions, i.e., notches 65. The respective reflecting portions 65 are defined such that the reflecting portions 65 are arrayed approximately equidistantly in an incident direction, i.e., in the width direction W, of the LED 61b on a side on the first direction D1 side of the main light guide portion 62. The reflecting portion 65 is defined into a shape of a vertical notch or a slit, i.e., a recessed portion, in which the first direction D1 side of a first plane thereof is inclined widthwise by 45 degrees toward the light source portion 61 and a second plane thereof is orthogonal to the width direction W. Because the material of the main light guide portion 62 and an air layer have different refraction indexes and an interface is formed at the reflecting portion 65 and the light is reflected totally or by predetermined transmissivity at the interface, the light emitted from the LED 61b is reflected in the second direction D2 as a first light beam LB1. Accordingly, the light of the LED 61b incident on the end face 62a of the main light guide portion 62 is reflected in the second direction D2 opposite from an incident face, i.e., a facing portion, 63a of the sub-light guide portion 63 by the plurality of reflecting portions 65 provided in the width direction W of the main light guide portion 62 while extending in an entire range in the width direction W along the main light guide portion 62. That is, the main light guide portion 62 guides the light emitted from the light source portion 61 to the reflecting portion 65 and guides the light reflected by the reflecting portion 65 to the cover member 64.

The cover member 64 is formed longitudinally in the width direction W and approximately into a groove or a shape of U opened to the first direction D1 side in terms of a section taken along a plane orthogonal to the width direction W. The main light guide portion 62 is fixed to a U-shaped inner circumferential side of the cover member 64, i.e., to a bottom of the U-shaped cover member, by means of adhesion, screwing or the like. An end face on the first direction D1 side of the cover member 64 is fixed to the incident face 63a of the sub-light guide portion 63 by means of adhesion, screwing or the like. That is, the cover member 64 is held so as to cover a part of the main light guide portion 62 and is supported by being attached to the sub-light guide portion 63. A width of the incident face 63a is greater than a width of the main light guide portion 62 in a vertical direction orthogonal to the width direction W and the first direction D1, i.e., an intersecting direction. It is possible to enhance light blocking effect between the cover member 64 and the sub-light guide portion 63 by fixing the end face on the first direction D1 side of the cover member 64 with the incident face 63a of the sub-light guide portion 63. Therefore, this arrangement makes it possible to reduce a loss of light amount in inputting the diffused and reflected light by the cover member 64 to the sub-light guide portion 63.

The cover member 64 is made white opaque in color by a synthetic resin material such as acrylonitrile butadiene styrene (ABS). Therefore, a white diffuse-reflecting surface 64a is formed in an inner peripheral portion of the cover member 64 and diffuses and reflects the light reflected by the reflecting portion 65. The light of the first light beam LB1 reflected in the second direction D2 by the reflecting portion 65 of the main light guide portion 62 is diffused and reflected by the diffuse-reflecting surface 64a of the inner peripheral portion of the cover member 64. The diffused and reflected light is incident in the main light guide portion 62. A part of the incident light is emitted from the main light guide portion 62 and is incident on the incident face 63a of the sub-light guide portion 63 as a second light beam LB2, and another part of the incident light is emitted from the main light guide portion 62 and is reflected by the diffuse-reflecting surface 64a of the cover member 64. Still another part of the diffuse-reflected light is diffused and reflected by the reflecting portion 65 and others within the main light guide portion 62. The light irradiated directly or by reflection toward the sub-light guide portion 63 is incident on the incident face 63a of the sub-light guide portion 63. That is, the main light guide portion 62 guides the light diffused and reflected by the cover member 64 to the incident face 63a of the sub-light guide portion 63. It is noted that while the case where the cover member 64 is formed of the white opaque ABS resin has been described in the present embodiment, the present disclosure is not limited to such a case. The cover member may be formed of transparent polycarbonate or acryl and an inner circumferential portion may be coated white in color to form the reflecting face for example.

The sub-light guide portion 63 is formed of polycarbonate or acryl which is a highly transparent insulating material and includes a condensing portion 63b and a guide portion 63c. The condensing portion 63b is formed into a shape of a prismatic column which is longitudinal in the width direction W such that a side surface facing the second direction D2 side is the incident face, i.e., the incident portion, 63a. The front surface of the cover member 64 is fixed to the incident face 63a, the incident face 63a faces the reflecting portion 65 of the main light guide portion 62, and the light that has transmitted through the main light guide portion 62 or diffused and reflected by the cover member 64 enters the incident face 63a. The condensing portion 63b includes a surface inclined from an upper side of the incident face 63a downward in the first direction D1 and a surface inclined from a lower side of the incident face 63a upward in the first direction D1. Thereby, the condensing portion 63b is configured to converge the light as the diffuse-reflected light incident on the incident face 63a advances in the first direction D1. It is noted that the condensing portion 63b, the cover member 64 and the main light guide portion 62 are provided so as to project outside of the casing 59 in the present embodiment.

The guide portion 63c is formed into a horizontal plain plate extending from an end portion on the first direction D1 side of the condensing portion 63b in the first direction D1. A thickness of the guide portion 63c is around 2 mm, for example. The guide portion 63c is provided horizontally between the intermediate transfer belt 44b and the toner conveyance portion 58 from the condensing portion 63b projecting out of the casing 59 toward the photosensitive drum 51. An end face on the first direction D1 side of the guide portion 63c faces the photosensitive drum 51 and is arranged to be a light emission face, i.e., a light emission portion 63d, from which the light is emitted along a fourth light beam LB4. Thereby, the sub-light guide portion 63 guides the light diffused and reflected by the cover member 64 to the photosensitive drum 51. Because the light diffused and reflected by the cover member 64 reaches the light emission face 63d while repeating total reflection toward the photosensitive drum 51 side in the condensing portion 63b and the guide portion 63c, the light from the LED 61b is irradiated in an entire range in the width direction W of the photosensitive drum 51. It is noted that an optical path from the incident face 63a to the light emission face 63d is linear, and the light incident on the incident face 63a horizontally along the second light beam LB2 advances linearly along the third light beam LB3.

Next, an operation of pre-exposure of the pre-exposing unit 60 described above will be described. As the image forming operation starts, the photosensitive drum 51 rotates and the control portion 11 turns on electricity of the light source portion 61 so as to light the LED 61b. Light emitted from the LED 61b advances in the main light guide portion 62 along the width direction W, is reflected in the second direction D2 by the plurality of reflecting portions 65 on its way, and the reflected light reaches the cover member 64 along the first light beam LB1. The reflected light is diffused and reflected by the diffuse-reflecting surface 64a of the cover member 64 and is returned to the main light guide portion 62 along the second light beam LB2 for example. The diffuse-reflected light may transmit through the main light guide portion 62 in the first direction D1, may advance in other directions and be diffused and reflected further by the diffuse-reflecting surface 64a, and may be reflected by the reflecting portion 65. Because the front edge surface on the first direction D1 side of the cover member 64 is fixed to the incident face 63a of the sub-light guide portion 63, the diffuse-reflected light is incident on the incident face 63a without leak.

The diffuse-reflected light incident on the incident face 63a is converged as the light advances in the first direction D1 in the condensing portion 63b, transmits in the first direction D1 while reflecting on the side surface of the guide portion 63c and advances along the third light beam LB3. The light is emitted from the light emission face 63d and irradiates the surface 51a of the photosensitive drum 51 along the fourth light beam LB4. At this time, because the light diffused and reflected by the cover member 64 reaches the light emission face 63d while repeating total reflection in the condensing portion 63b and the guide portion 63c toward the photosensitive drum 51 side, the light emitted from the LED 61b can be irradiated to the entire range in the width direction W of the photosensitive drum 51.

As described above, the pre-exposing unit 60 of the present embodiment includes the reflecting portion 65 that reflects the light emitted from the light source portion 61, the cover member 64 that diffuses and reflects the light reflected by the reflecting portion 65, and the sub-light guide portion 63 that guides the light diffused and reflected by the cover member 64 toward the photosensitive drum 51. Therefore, as compared to a case where light reflected by a reflecting portion of a light guide body is guided to a photosensitive drum as it is, it is possible to homogenize an amount of emitted light because the light is diffused and reflected. Still further, as compared to a case where the light reflected by the reflecting portion of the light guide body is guided to the photosensitive drum as it is, it is possible to realize the homogenization of the light amount by adding the diffuse-reflecting cover member 64. Accordingly, this arrangement makes it possible to homogenize the distribution of the amount of light irradiated to the photosensitive drum 51 from the pre-exposing unit 60 without increasing the size of the pre-exposing unit 60 for removing electricity.

Still further, according to the pre-exposing unit 60 of the present embodiment, the light reflected by the reflecting portion 65 of the main light guide portion 62 is once reflected in the opposite direction from the photosensitive drum 51 and is reflected so as to return again in the direction of the photosensitive drum 51 side by the cover member 64. The diffusion and reflection of the light occurs on the diffuse-reflecting surface 64a because the cover member 64 is composed of a resin member or the like not mirror finished. The diffuse-reflection also brings about an effect of spreading the diffused light in the width direction W of the photosensitive drum 51. Still further, because the color of the resin material is white, reflectance at the cover member 64 becomes high, thus preventing a loss of the light amount.

Still further, according to the pre-exposing unit 60 of the present embodiment, the light is finally irradiated to the surface 51a of the photosensitive drum 51 from the light emission face 63d of the sub-light guide portion 63 formed into the shape of a thin plate, which is a different member from the main light guide portion 62. Here, it is desirable to install the pre-exposing unit 60 between the cleaning blade 55 and the primary transfer portion T1. However, because it is necessary to dispose the collection sheet 57, the toner conveyance portion 58 and others between the cleaning blade 55 and the primary transfer portion T1, there is a case where there is no space for installing the pre-exposing unit 60 closely to the photosensitive drum 51 if the drum cartridge 50 is downsized. In contrast, according to the pre-exposing unit 60 of the present embodiment, only the light emission face 63d of the sub-light guide portion 63 needs to be close to the photosensitive drum 51. Therefore, because the main light guide portion 62 and the cover member 64 whose sizes are determined by the size of the LED 61b can be disposed outside of the casing 59 where there is relatively an enough space, the drum cartridge 50 can be downsized.

Still further, according to the pre-exposing unit 60 of the present embodiment, the main light guide portion 62 and the sub-light guide portion 63 are formed of the different members, so that strength of the members can be enhanced as compared to a case where these members are integrally molded. That is, in the case where the main light guide portion 62 and the sub-light guide portion 63 are integrally molded, it is necessary to perforate a plurality of holes in a vertical direction at a center part of the integrally molded member if the reflecting portion 65 is defined in a shape of a slit. In such a case, while it is difficult to mold the resin itself, there is a possibility that strength of the molded product drops. However, it is possible to avoid such problem from occurring by forming the main light guide portion 62 and the sub-light guide portion 63 by the different members in the present embodiment.

Example

Figure 6:
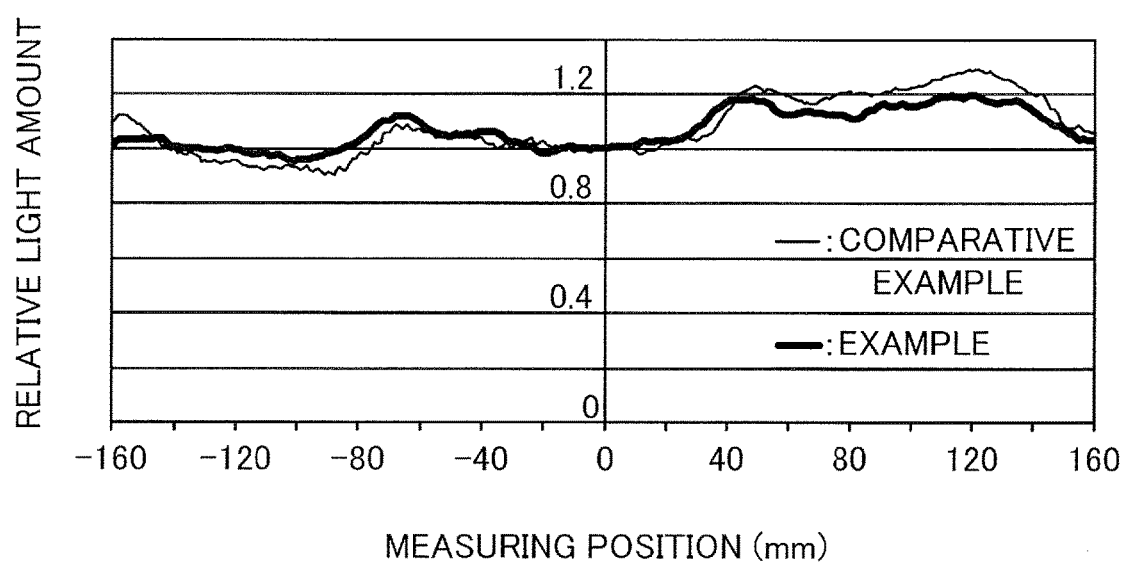
FIG. 6 is a graph indicating a distribution of light amount of the pre-exposing unit of the first embodiment.

A distribution of amounts of light irradiated to the photosensitive drum 51 by utilizing the pre-exposing unit 60 of the present embodiment described above was measured. FIG. 6 indicates results of the measurement. In FIG. 6, an axis of abscissa represents positions where the light amounts were measured by setting a center part in the width direction W of the photosensitive drum 51 as zero, and an axis of ordinate represents a relative light amount when the light amount at the center part where the measured position is 0 mm is set at 1.0.

Comparative Example

A distribution of amounts of light irradiated to the photosensitive drum 51 by utilizing a pre-exposing unit that directly irradiates reflected light to the photosensitive drum 51 from the reflecting portion 65 of the main light guide portion 62 without including the cover member 64 and the sub-light guide portion 63 was measured. FIG. 6 also indicates results of the measurement. As indicated in FIG. 6, while unevenness of the light amount of a short period has occurred in the comparative example, no such unevenness of the light amount has occurred in the example. Still further, a difference between a maximum value and a minimum value of the light amount within a measured range has been small in the example as compared to the comparative example. It was thus confirmed from these facts that the distribution of the amounts of light irradiated to the photosensitive drum 51 from the pre-exposing unit 60 can be homogenized by the example.

Second Embodiment

Figure 7:
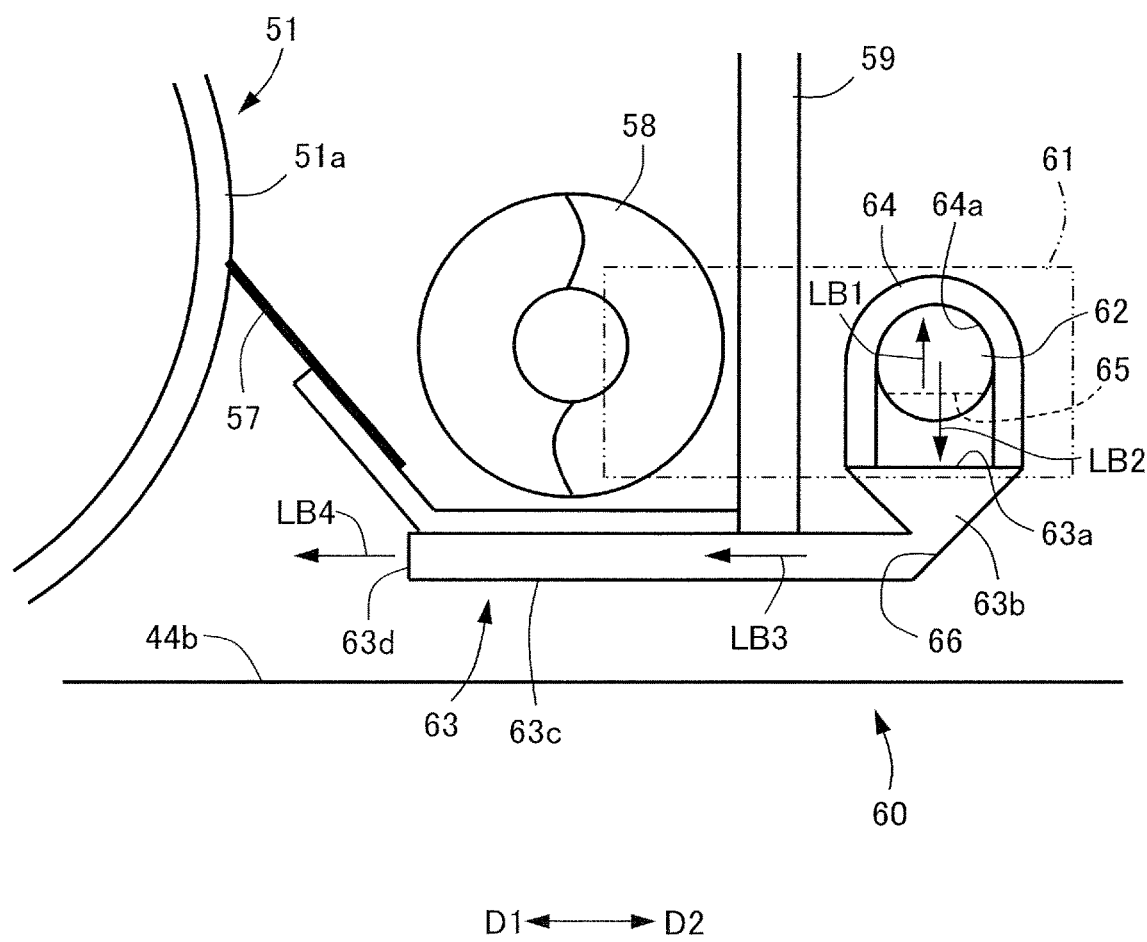
FIG. 7 is a section view schematically illustrating a configuration of a drum cartridge of an image forming apparatus of a second embodiment.

Next, a second embodiment of the pre-exposing unit 60 of the present disclosure will be described in detail with reference to FIG. 7. A configuration of the pre-exposing unit 60 of the present embodiment is different from that of the first embodiment in that an optical path within the sub-light guide portion 63 is bent. Because components other than that are same with those of the first embodiment, they are denoted by the same reference numerals and detailed descriptions thereof will be omitted here.

According to the present embodiment, the sub-light guide portion 63 includes a reflecting face, i.e., a bending portion, 66 that bends an optical path within an optical path from the incident face 63a to the light emission face 63d. The reflecting face 66 forms a bending optical path to direct the light inputted from the incident face 63a to the light emission face 63d. In the sub-light guide portion 63, the condensing portion 63b is disposed such that the incident face 63a faces upward, and a lower part of the condensing portion 63b is continued to an end on the second direction D2 side of the guide portion 63c. The reflecting face 66 is formed at the part where the lower part of the condensing portion 63b is connected with the end portion on the second direction D2 side of the guide portion 63c and is set as a plane inclined by about 45 degrees to a horizontal plane such that the first direction D1 side is lower than the second direction D2 side. The main light guide portion 62 is disposed such that the reflecting portion 65 faces downward. The cover member 64 is disposed such that the U-shaped opening also faces downward.

The light emitted from the LED 61b advances in the main light guide portion 62 along the width direction W and is reflected upward by the plurality of reflecting portions 65 on its way. The light reflected by the reflecting portion 65 reaches the cover member 64 along the first light beam LB1. The reflected light is diffused and reflected by the diffuse-reflecting surface 64a of the cover member 64 and is returned to the main light guide portion 62 along the second light beam LB2 for example. The diffuse-reflected light may transmit through the main light guide portion 62 downward, may advance in other directions and be diffused and reflected further by the diffuse-reflecting surface 64a, and may be reflected by the reflecting portion 65. The diffuse-reflected light incident on the incident face 63a is converged as the light advances downward in the condensing portion 63b, is reflected by the reflecting face 66 in the first direction D1, transmits in the first direction D1 while reflecting on the side surface of the guide portion 63c and advances along the third light beam LB3. The light is emitted from the light emission face 63d and irradiates the surface 51a of the photosensitive drum 51 along the light beam LB4.

As compared to the case where light reflected by the reflecting portion of the light guide body is guided to the photosensitive drum as it is, it is possible to homogenize an amount of emitted light because the light is diffused and reflected also by the pre-exposing unit 60 of the present embodiment. Still further, as compared to the case where the light reflected by the reflecting portion of the light guide body is guided to the photosensitive drum as it is, it is possible to realize the homogenization of the light amount by adding the diffuse-reflecting cover member 64. Accordingly, this arrangement makes it possible to homogenize the distribution of the amount of light irradiated to the photosensitive drum 51 from the pre-exposing unit 60 without increasing the size of the pre-exposing unit 60 for removing electricity.

Still further, according to the pre-exposing unit 60 of the present embodiment, because the optical path from the reflecting portion 65 of the main light guide portion 62 to the incident face 63a is arranged vertically, a direction in which the cover member 64 that projects out of the casing 59 can be set vertically. Due to that, as compared to the case where the cover member 64 is set laterally, a length in the lateral direction of the drum cartridge 50 can be shortened and an outer space of the second direction D2 side of the drum cartridge 50 can be widened. Thereby, the image forming apparatus 1 can be downsized laterally.

It is noted that while the case where the cover member 64 is formed of one member having an approximately U-shaped section has been described in the pre-exposing unit 60 of the respective embodiments described above, the present disclosure is not limited to such configuration. For instance, the cover member 64 may be formed by integrating two members split along the width direction W. In such a case, works for assembling with the main light guide portion 62 can be facilitated.

Figure 8:
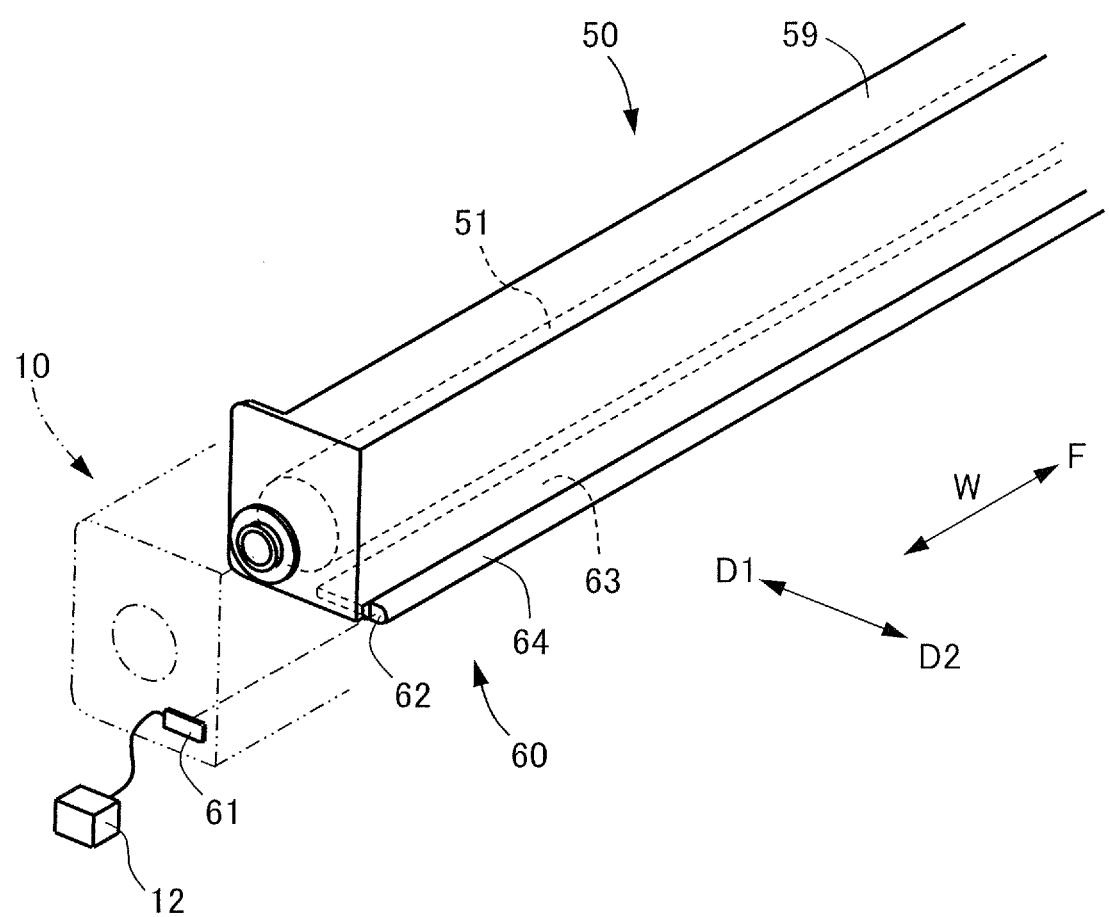
FIG. 8 is a perspective view illustrating a drum cartridge of an image forming apparatus related to a variation of the image forming apparatus of the first embodiment.

Still further, while the case where the pre-exposing unit 60 is provided entirely within the drum cartridge 50 has been described in the embodiments described above, the present disclosure is not limited to such configuration. For instance, the pre-exposing unit 60 may be configured such that a part thereof is provided within the drum cartridge 50 and another part thereof is provided within the apparatus body 10. For instance, as illustrated in FIG. 8, the pre-exposing unit 60 may be configured such that the main light guide portion 62, the cover member 64 and the sub-light guide portion 63 within the pre-exposing unit 60 are provided in the drum cartridge 50 and such that only the light source portion 61 is provided in the apparatus body 10. In such a case, the main light guide portion 62, the cover member 64 and the sub-light guide portion 63 are configured to be integrally taken out of the apparatus body 10 when the light source portion 61 is left in the apparatus body 10. In such a case, because the light source portion 61 which is costly among the components within the pre-exposing unit 60 can be commonly used among a plurality of drum cartridges 50, it is possible to lower costs of the parts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-091715, filed May 2, 2017, which is hereby incorporated by reference herein in its entirety.

What is claimed is:
1. An image forming apparatus comprising:
a rotatable photosensitive member;
a movable intermediate transfer member;

an image forming portion configured to form a toner image, to be transferred onto the intermediate transfer member, onto the photosensitive member;

a cleaning unit configured to remove toner left on a surface of the photosensitive member after transferring the toner image onto the intermediate transfer member, the cleaning unit comprising a cleaning member configured to remove the toner and a cleaning frame supporting the cleaning member; and a light irradiating portion configured to irradiate the photosensitive member with light after transferring the toner image onto the intermediate transfer member to remove electricity of the photosensitive member, the light irradiating portion comprising:

a first light guide body configured to extend along a rotation axial direction of the photosensitive member;

a light source portion provided to face an end surface portion of the first light guide body in the rotation axial direction;

a reflecting portion disposed to face the first light guide body in an intersecting direction intersecting with the rotation axial direction; and a second light guide body comprising a facing portion disposed to face the first light guide body and to oppose the reflecting portion through the first light guide body, and configured to irradiate the photosensitive member with the light transmitted through the first light guide body, wherein in a cross-section orthogonal to the rotation axial direction, the first light guide body is disposed at a position farther from the photosensitive member than the cleaning frame with respect to a moving direction of the intermediate transfer member, and at least a part of the second light guide body extends from a first light guide body side toward a photosensitive member side between the cleaning frame and the intermediate transfer member.

2. The image forming apparatus according to claim 1, wherein the reflecting portion surrounds a part of the first light guide body and holds the first light guide body.

3. The image forming apparatus according to claim 1, wherein the reflecting portion comprises a white reflecting face.

4. The image forming apparatus according to claim 1, wherein a width of the facing portion of the second light guide body in a direction orthogonal to the rotation axial direction is greater than a width of the first light guide body in the direction orthogonal to the rotation axial direction.

5. The image forming apparatus according to claim 1, wherein the first light guide body comprises a columnar shape.

6. The image forming apparatus according to claim 1, wherein the first light guide body comprises a plurality of recessed portions at a part facing the facing portion of the second light guide body, the plurality of recessed portions being disposed along the rotation axial direction and reflect the light emitted from the light source portion toward the reflecting portion.

7. The image forming apparatus according to claim 1, wherein the second light guide body comprises a shape of a plate.

8. The image forming apparatus according to claim 1, wherein the second light guide body comprises a light emission portion configured to emit the light inputted from the facing portion, the light emission portion and the facing portion being disposed linearly.

9. The image forming apparatus according to claim 1, wherein the second light guide body comprises a light emission portion configured to emit the light inputted from the facing portion, the light emission portion being disposed orthogonally to the facing portion.

10. The image forming apparatus according to claim 9, wherein the second light guide body comprises a bending portion forming a bending optical path to direct the light inputted from the facing portion to the light emission portion.

11. The image forming apparatus according to claim 1, further comprising an apparatus body configured to store the light irradiating portion, wherein the first and second light guide bodies are configured to be integrally taken out of the apparatus body in a state in which the light source portion is left in the apparatus body.

12. A photosensitive member unit comprising:

a rotatable photosensitive member that bears a toner image to be transferred onto a transfer material; and a light irradiating portion configured to irradiate the photosensitive member with light after transferring the toner image onto the transfer material to remove electricity of the photosensitive member, the light irradiating portion comprising:

a first light guide body configured to extend along a rotation axial direction of the photosensitive member, light from a light source portion being irradiated to an end surface portion of the first light guide body in the rotation axial direction;

a reflecting portion disposed to face the first light guide body in an intersecting direction intersecting with the rotation axial direction; and a second light guide body comprising a facing portion disposed to face the first light guide body and to oppose the reflecting portion through the first light guide body, and configured to irradiate the photosensitive member with the light transmitted through the first light guide body, wherein a width of the facing portion in a direction orthogonal to the rotation axial direction is greater than a width of the first light guide body in the direction orthogonal to the rotation axial direction.

13. The photosensitive member unit according to claim 12, further comprising the light source portion.

14. The photosensitive member unit according to claim 12, wherein the reflecting portion surrounds a part of the first light guide body and holds the first light guide body.

15. The photosensitive member unit according to claim 12, wherein the reflecting portion comprises a white reflecting face.

16. The photosensitive member unit according to claim 12, wherein the first light guide body comprises a columnar shape.

17. The photosensitive member unit according to claim 12, wherein the first light guide body comprises a plurality of recessed portions at a part facing the facing portion of the second light guide body, the plurality of recessed portions being disposed along the rotation axial direction and reflect the light emitted from the light source portion toward the reflecting portion.

18. The photosensitive member unit according to claim 12, wherein the second light guide body comprises a shape of a plate.

* * * * *